United States Patent Office 3,405,767
Patented Oct. 15, 1968

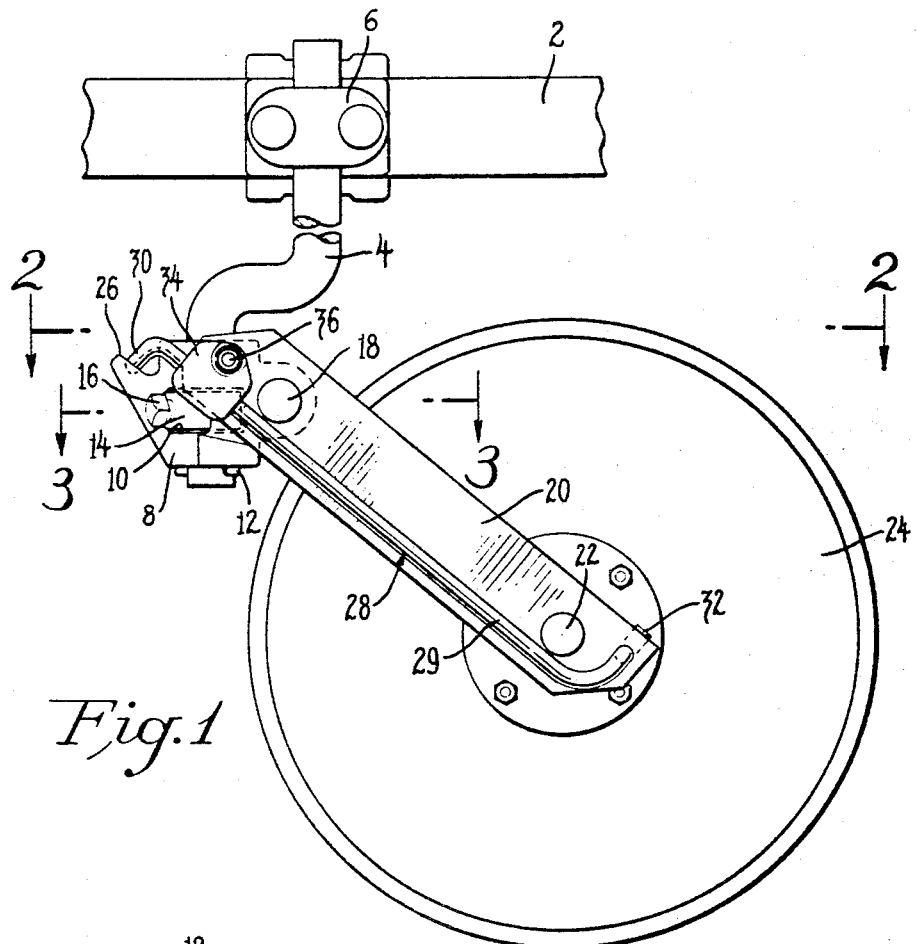
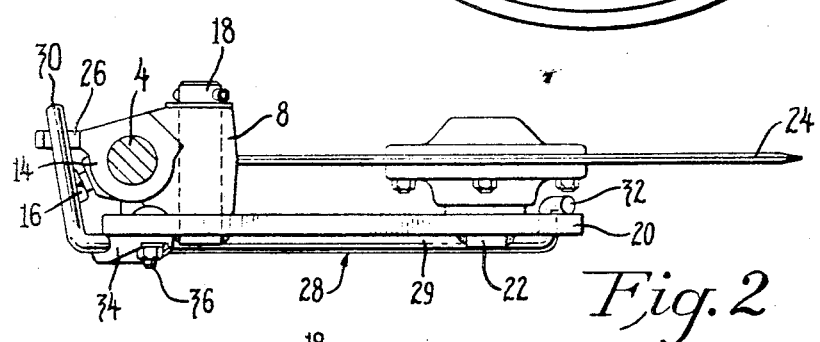
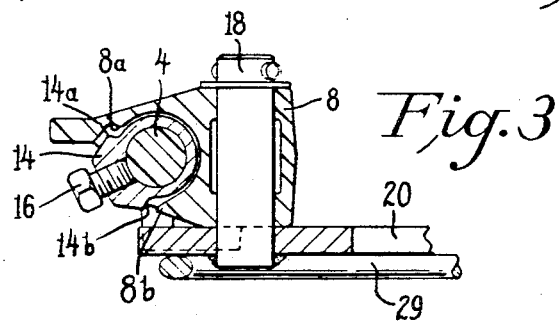

3,405,767
TORSION BAR MOUNTING FOR COULTER DISCS
Howard G. Thompson, Livonia, Mich., assignor to
Massey-Ferguson Inc., Detroit, Mich.
Filed Sept. 9, 1965, Ser. No. 486,138
2 Claims. (Cl. 172—572)

ABSTRACT OF THE DISCLOSURE

A coulter assembly including a coulter disc mounted on one end of an arm member pivotally supported on a bracket. The coulter is biased to a working position by a torsion bar clamped between its ends to the arm member and having one end abutting the bracket and its other end engaged in an aperture in the arm member.

This invention relates generally to mountings for earth working tools, and is particularly concerned with yieldable mountings for coulter discs.

In order for coulters to properly perform in cutting roots, weeds and the like, clearing trash and slicing the soil ahead of plows, sufficient force must be exerted on the coulter disc to hold it in position with respect to the plow frame and maintain it at a proper working depth in the soil. Without a yieldable mounting, however, the coulter is frequently damaged by rocks and similar obstructions. Presently available coulters having yieldable mountings have not been found to be generally acceptable due to their expense and the frequency of repairs and cleaning that is necessary.

In accordance with the present invention, the coulter is mounted on an arm member pivotally connected with a support bracket carried by the shank. The coulter pivots upwardly and downwardly about the bracket in a vertical plane about a transverse axis with respect to the shank. For biasing the coulter to a working position, a torsion bar is engaged between the support bracket and arm member to resiliently resist movement of the coulter from its working position.

The torsion bar preferably includes a straight portion with angularly disposed bent portions at its ends which are engaged respectively with the support bracket and arm member. The support bracket includes a notch for receiving one of the bent end portions and the arm member carrying the coulter disc has an opening for receiving the other bent portion and the straight portion of the torsion bar is clamped to the support arm member near the connection with the bracket. Consequently, when the disc engages a rock or other hard object the torsion bar permits the disc to move upwardly about its pivotal connection with the support bracket to clear the obstacle and yet maintains a resilient force on the coulter sufficient for it to perform its root cutting and trash clearing operations.

The objects, advantages and features of the invention will become apparent from the following description taken in connection with the accompanying drawing in which:

FIG. 1 is an elevational view of a coulter assembly embodying the invention; and FIGS. 2 and 3 are sectional detailed views taken on lines 2—2 and 3—3, respectively, of FIG. 1.

With reference to the drawings, the coulter assembly of the present invention is supported on a plow beam or other support 2 and includes a conventional crank-shaped shank 4 mounted at its upper end on beam 2 by a conventional clamp 6. Rotatably received on the lower end of shank 4 is a support bracket 8 which is formed with a transverse slot 10. Bracket 8 is restrained against downward movement relative to shank 4 by a conventional cotter pin 12, and is restrained against upward movement on shank 4 by a collar 14 which is mounted on shank 4 and received in slot 10. Collar 14 is restrained against rotation relative to shank 4 by a set screw 16.

Bracket 8 and collar 14 are provided with cooperating abutments or shoulders 8a, 8b and 14a, 14b, respectively. As viewed in FIG. 3, counterclockwise rotation of bracket 8 on shank 4 is limited by engagement of shoulder 8a with shoulder 14a, and clockwise rotation of bracket 8 with respect to shank 4 is limited by engagement of shoulder 8b with shoulder 14b.

Rotatably mounted in bracket 8 is a transverse pin 18 which is welded or otherwise secured at one end to a support arm 20. Carried by the free end of support arm 20 is a coulter disc 24 rotatably mounted on a transverse shaft 22 welded or otherwise secured to arm 20. Support arm 20 is biased to a working position relative to shank 4 in which it extends downwardly and rearwardly with respect to the direction of travel of the plow by a torsion bar 28 having one end engaged with a notch 26 formed in bracket 8 and its opposite end engaged with arm 20 adjacent the lower, free end thereof. Torison bar 28 includes a straight portion 29 with an angularly disposed bent portion 30 at its upper end which is received in notch 26, and an angularly disposed bent portion 32 at its lower end which is received in an aperture in support arm 20. The lower bent portion 32 is shown hooked at its outer end to prevent withdrawal of portion 32 from the opening in support arm 20. The straight portion 29 of the torsion bar 28 is secured to support arm 20 by a clamp 34 mounted on arm 20 adjacent its upper end by a bolt and nut assembly 36.

During operation, as the coulter advances over the ground (toward the left in FIG. 1), portion 30 reacts against the forward wall of the notch 26 and causes torsion bar 28 to bias the coulter disc to its working position and slice the earth in advance of the plow. When the coulter disc 24 encounters a rock or similar obstacle, torsion bar 28 resiliently yields sufficiently to permit the coulter to move upwardly with respect to shank 4 and bracket 8, and when the obstacle is cleared the coulter is returned to its normal working position by the torsion bar assuming its unstressed position.

With the torsion bar described above and illustarted in the accompanying drawings, the manufacturing costs are reduced substantially as compared with conventional spring loaded coulters, operational efficiency is enhanced. The mounting is simple to assemble and disassemble, and there is little likelihood of the torsion bar failing to operate due to picking up trash and dirt as would be the case with helical springs.

While a preferred embodiment of the invention has been illustrated and described, it should be understood that the invention is not limited to the exact construction shown but that various equivalents and alterations in the construction and arrangement of parts can be made without departing from the scope and spirit of the invention.

I claim:

1. A coulter assembly comprising: a shank; a support bracket mounted on said shank; an arm member mounted on said bracket for pivotal movement about a transverse axis relative to said shank; a coulter disc mounted on the end of said arm member remote from said bracket; and spring means engaged between said bracket and arm member for biasing the coulter to a working position with respect to the shank and resiliently resisting pivotal movement of the coulter disc and arm member from said working position, said spring means comprising a torsion bar having one end engaged with said bracket and its other end engaged with said arm member, said torsion bar including a straight portion with angularly disposed bent portions at each end thereof, said straight portion extending along the length of said arm member and said bent portions projecting therefrom into engagement with the bracket and arm members, means clamping said straight portion of the torsion bar to the arm member intermediate the ends of the straight portion, and said bracket being formed with a notch for receiving the upper bent portion of the torsion bar.

2. A coulter assembly comprising a shank; a support bracket mounted on said shank; an arm member mounted on said bracket for pivotal movement about a transverse axis relative to said shank; and a torsion bar clamped to said arm member, said torsion bar having a straight portion extending along the arm member and angularly disposed bent portions at each end thereof, there being a hole in the arm member near the end remote from said bracket with one of said bent end portions of the torsion bar received in said opening, the other of said bent portions being engaged with said bracket to bias the coulter to a working position with respect to the shank.

References Cited

UNITED STATES PATENTS 3,022,992   2/1962   Hanslip _____ 267—57

FOREIGN PATENTS 619,879   3/1949   Great Britain.

ABRAHAM G. STONE, Primary Examiner.

R. C. HARRINGTON, Assistant Examiner.